No. 731,325. PATENTED JUNE 16, 1903.
C. SHABLEY.
HARROW.
APPLICATION FILED SEPT. 15, 1902.
NO MODEL.
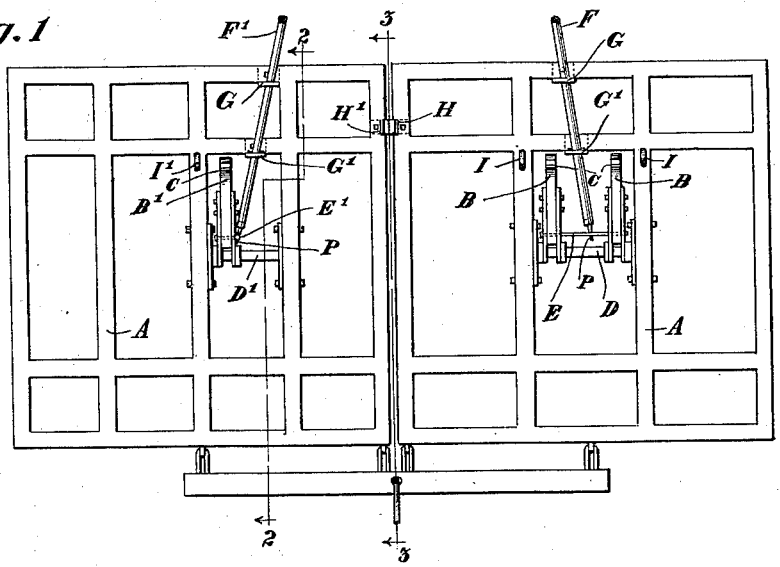
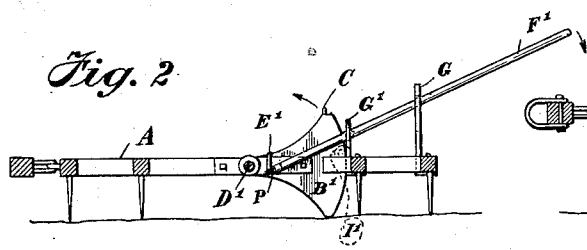
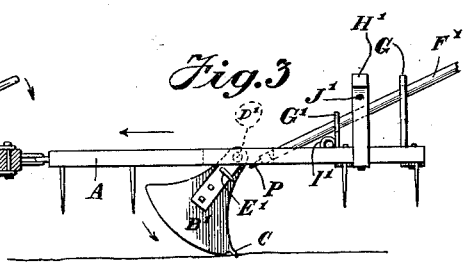
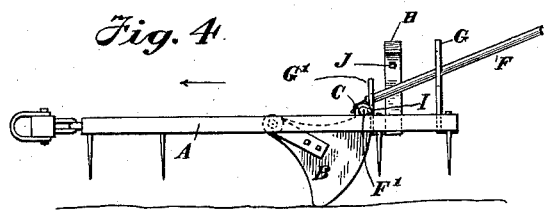
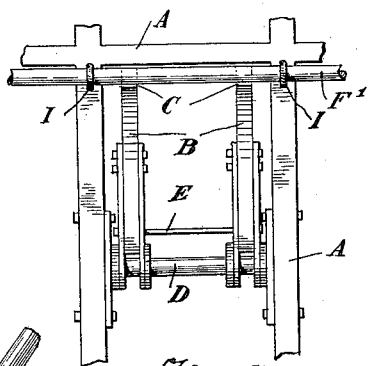
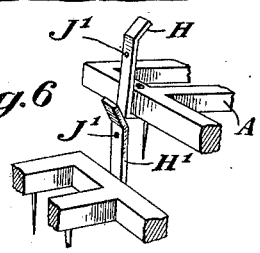
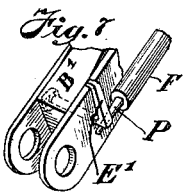
Witnesses:
J B Weir
H M Krueger
Inventor:
Charles Shabley
By W E Williams
Atty.
THE NORRIS PETERS CO., PHOTO-LITHO., WASHINGTON, D. C.

No. 731,325.

Patented June 16, 1903.

UNITED STATES PATENT OFFICE.

CHARLES SHABLEY, OF WESSINGTON SPRINGS, SOUTH DAKOTA.

HARROW.

SPECIFICATION forming part of Letters Patent No. 731,325, dated June 16, 1903.

Application filed September 15, 1902. Serial No. 123,496. (No model.)

*To all whom it may concern:*

Be it known that I, CHARLES SHABLEY, a citizen of the United States of America, and a resident of Wessington Springs, South Dakota, have invented certain new and useful Improvements in Harrows, of which the following is a specification.

My invention relates especially to means for raising the harrow free from the ground for transportation from place to place and to momentarily lifting it to discharge from time to time such material as the teeth may have accumulated. The raising of the harrow is secured by the use of rotary shoes, which by a cam-like action lift the harrow bodily when in rotating they pass beneath their axes of rotation and which when locked in position to hold the harrow raised serve as runners, sliding over the ground as the harrow is drawn forward.

In the accompanying drawings, Figure 1 is a plan view of a harrow equipped with my devices. Figs. 2, 3 are sections on the lines 2 2, 3 3, respectively, the latter figure showing the harrow partly raised. Fig. 4 shows the harrow locked in raised position. Figs. 5, 6, 7 are detail views.

The harrow may consist of one or more sections; but for illustration I have shown two sections normally, not directly, connected.

In the drawings, A represent a harrow, and B B' shoes revolubly mounted upon the frame, in this instance upon rods D D', and normally having the working portions lying in the rear of the axes of rotation, as in Fig. 2. When either shoe is swung upward and forward, it drops upon the ground in front of its axis, a spur C entering the ground and preventing its slipping, and then as the harrow advances it rolls upon the ground and first raises the harrow bodily, as indicated in Fig. 3, and then lowers it to normal position as the shoe by the advance of the harrow approaches its normal relative position. Each harrow-section may have one or more shoes, and where it has but one that one is provided with a catch or projection E', by which it may be engaged to throw it forward, while if the section has more than one they are connected by a bar E, compelling them to move together and at the same time serving the same purpose as the projection E'. For thus throwing the shoes forward over their axes I provide hand-levers F F', each downwardly and forwardly inclined and passing loosely through a vertical slot in a guide G and through an aperture in a fulcrum-support G', so that the lower or forward arm P is normally in position to engage and support the projection E' or the rod E. If it be desired to discharge accumulated material which may have been collected by the harrow-teeth, the rear arms of the levers are pressed downward suddenly in the guiding-slots, and thereby the shoes are impelled upwardly forward and are carried over their axes by momentum, which with the aid of gravity causes the spurs C to engage the earth and prevent the shoes from sliding along the ground. The advance of the harrow then causes the shoes to roll onward and first lift and then lower the harrow in the manner already described. After the shoes have been thus thrown forward the levers may be moved out of the paths of the projections or rods, so that the shoes may again assume their normal positions, although the incline upon the projections would cause them to automatically move the levers and pass them.

When the shoes are to be locked in such position that they may hold the harrow raised and serve as runners—in taking it from field to field, for example—they are first thrown over, as described, and the levers are then withdrawn longitudinally and inserted in loops I I', which hold them in the paths of the shoes, compelling the latter to hold the harrow in raised position, as indicated in Fig. 4.

To prevent one section from overlapping and riding upon another, fenders H H' are fixed to adjacent sections, as shown, and when desired a bolt J may be inserted in boltholes J' in these sections to directly connect adjacent sections and compel them to rise and fall together. When this is done, the whole harrow may be supported upon the shoe or shoes of one section, the operator making use of the other lever or levers left in normal position to balance and guide or turn the whole. In fact, advantage being taken of the support which the tractional force affords for the front side of the harrow such lever or levers may serve for lifting the whole structure free from the ground and swinging it to either side just as in the case of the ordinary plow.

What I claim is—

1. The combination with a harrow, of a shoe revolubly mounted thereon and adapted to lift the harrow from the ground when swinging below its axis of revolution, a hand-lever fulcrumed upon the harrow and adapted to impart to the shoe an upwardly-forward impulse, and a guide limiting the swing of the lever, substantially as set forth.

2. The combination with a harrow, of a shoe revolubly mounted thereon and adapted to lift the harrow in passing beneath its own axis, a lever passing loosely through an aperture in a fulcrum upon the harrow and in position to engage the shoe in the rear of the axis of the latter and throw it upward and forward, and means for limiting the swing of the lever.

3. The combination with a harrow consisting of a plurality of sections normally not directly connected, of shoes revolubly mounted upon the sections, respectively, and adapted to lift the harrow when passing beneath their axes, levers detachably mounted upon the sections, respectively, in position to engage the shoes and throw them forwardly over their axes, respectively, and means for at will securing the sections together to move as one whole.

4. The combination with a harrow, of two segmental shoes connected by a bar and revolubly mounted upon the harrow and adapted to lift the harrow in passing beneath their axis of revolution, a perforated fulcrum and a vertically-slotted guide fixed upon the harrow, and a normally inclined lever passing through said guide and fulcrum and sliding into and out of position to engage said bar, substantially as set forth.

Signed at Chicago this 29th day of August, 1902.

CHARLES SHABLEY.

Witnesses:
 AXEL AKERHOLM,
 LEON BEACH.